S. WETMORE.
FISH HOOK RELEASER.
APPLICATION FILED JUNE 1, 1912.
1,042,630.
Patented Oct. 29, 1912.
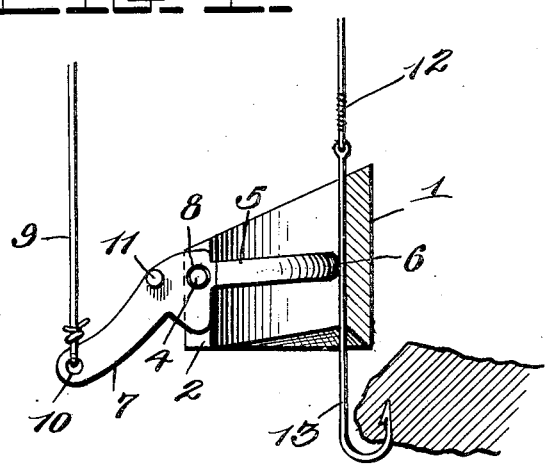
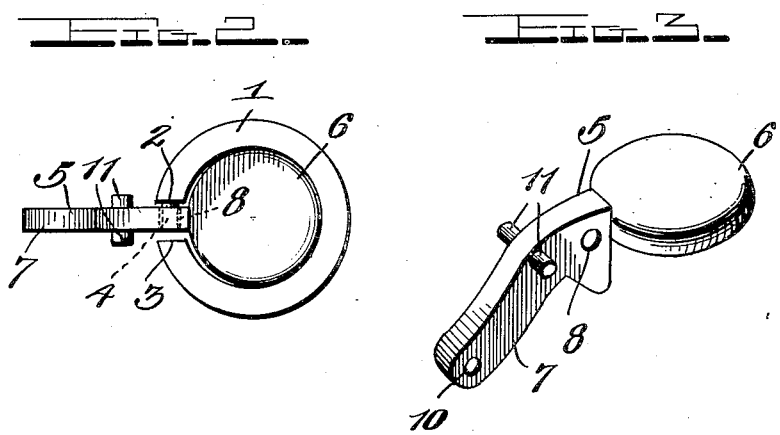
Witnesses
Chas. K. Griesbauer.
A. B. Norton.
Inventor
S. Wetmore,
By Watson E. Coleman
Attorney

UNITED STATES PATENT OFFICE.

SHERMAN WETMORE, OF COLUMBIA, CALIFORNIA.

FISH-HOOK RELEASER.

1,042,630. Specification of Letters Patent. Patented Oct. 29, 1912.

Application filed June 1, 1912. Serial No. 701,081.

*To all whom it may concern:*

Be it known that I, SHERMAN WETMORE, a citizen of the United States, residing at Columbia, in the county of Tuolumne and State of California, have invented certain new and useful Improvements in Fish-Hook Releasers, of which the following is a specification, reference being had to the accompanying drawings.

This invention relates to certain new and useful improvements in fish hook releasers and has for its object to provide a device of this nature which shall be simple in construction, efficient in operation and which may be easily applied to a fishing line.

The invention also aims to generally improve devices of this nature to render them more useful and commercially desirable.

With these and other objects in view, as shall become more apparent as the description proceeds, the invention consists of certain novel constructions and arrangement of parts as I shall hereinafter fully describe and claim.

In the embodiment of my invention I provide an obliquely truncated tubular body member having a gripping plate mounted to swing within the said body member and engage the walls thereof, said gripping plate being formed with an outwardly extending lever arm.

For a complete understanding of my invention, reference is to be had to the following description and accompanying drawing, in which—

Figure 1 is a side elevation of my device partly in section; Fig. 2 is a top plan view of the same; and Fig. 3 is a perspective view of the gripping member.

Referring to the drawing by numerals, 1 designates a hollow cylindrical body which is obliquely truncated. The body is split along the line of its shortest element and has its lateral edges 2 and 3 spaced from each other. A lug 4 extends circumferentially from the lateral edge 2 and projects transversely between the spaced edges 2 and 3 terminating short of the lateral edge 3. This lug 4 forms a pivot for the gripping member 5, said gripping member comprising a circular gripping plate 6 and a lever arm 7 formed integrally therewith. The lug 4 passes through a circular opening 8 formed in the lever arm 7 and holds the gripping plate in such a position that it may swing inwardly and outwardly in relation to the body 1. A pull line 9 is secured in the opening 10 formed in the outer end of the lever arm 7. The lever arm 7 is equal in width to the length of the lug 4 and is provided with the laterally extending stop lugs 11 which engage the outer surface of the body 1 to prevent the gripping member 5 opening to an undesirable position. The lower end of the body 1 is beveled as shown to eliminate as far as possible frictional wear upon the fishing line. The clamping plate 6 has its periphery rounded as shown in the drawing to provide an efficient clamping surface to prevent cutting the fishing line when clamped against the same.

In the operation of my fish hook releaser the snagged line 12 is slipped within the body 1 through the opening left between the end of the lug 4 and the lateral edge 3. Then the device which is preferably made of a heavy metal, is allowed to run down the fishing line until it passes over the snagged hook 13 thereon. When in this position an upward pull on the line 9 will cause the clamping member 5 to bind against the shank of the hook 13 and release the same from whatever object it may be attached to. It will be noticed that the upper portion of the truncated body serves as a guide to direct the gripping plate 6 into proper engagement with the shank of the hook 13.

From the foregoing description in connection with the accompanying drawing it will be seen that I have provided a simple device comprising only two parts. It is to be understood that minor changes in the design may be made without departing from the scope of the invention as defined by the appended claims.

Having thus described my invention, what I claim is:—

1. A fish hook releaser comprising a split tubular body, the edges of said body being spaced apart, a circumferentially projecting lug formed on one of said edges and extending directly across the space between the edges and terminating short of the opposite edge, a gripping member comprising a gripping plate adapted to swing within said tubular body and being formed with an outwardly projecting lever arm, said arm being equal in thickness to the length of the lug and having a circular opening adjacent its inner end to receive said lug, and means connected with the free end of the lever arm for actuating the same.

2. A fish hook releaser comprising an obliquely truncated hollow cylindrical body, said body being split for its entire length along the line of its shortest element and having its lateral edges spaced from each other, a circumferentially extending lug formed on one of said lateral edges and terminating short of the other, said lug extending directly across the space between the lateral edges, a gripping member comprising a circular gripping plate formed with a radially extending lever arm formed with a circular opening adjacent its inner edge for the reception of said lug, the lever arm being equal in thickness to the length of the lug thereby providing an opening between said lever and one of the lateral edges of the cylindrical body through which a line may be passed, and means connected with the free end of the lever arm for the purpose of actuating the same to cause the circular gripping plate to bind against an object passing through the cylindrical body.

In testimony whereof I hereunto affix my signature in the presence of two witnesses.

SHERMAN WETMORE.

Witnesses:
HUBERT E. BRADY,
FRANK J. DONDERO.